United States Patent
Ambula et al.

(10) Patent No.: US 11,977,768 B2
(45) Date of Patent: May 7, 2024

(54) WRITE BUFFER EXTENSIONS FOR STORAGE INTERFACE CONTROLLERS

(71) Applicant: Micron Technology, Inc., Boise, ID (US)

(72) Inventors: Sharath Chandra Ambula, Mancherial (IN); Sushil Kumar, Hyderabad (IN); Venkata Kiran Kumar Matturi, Khammam (IN)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 17/807,838

(22) Filed: Jun. 20, 2022

(65) Prior Publication Data

US 2023/0147027 A1 May 11, 2023

Related U.S. Application Data

(60) Provisional application No. 63/277,354, filed on Nov. 9, 2021.

(51) Int. Cl.
*G06F 3/06* (2006.01)
*G06F 1/3234* (2019.01)

(52) U.S. Cl.
CPC .......... *G06F 3/0656* (2013.01); *G06F 1/3275* (2013.01); *G06F 3/0625* (2013.01); *G06F 3/0647* (2013.01); *G06F 3/0679* (2013.01)

(58) Field of Classification Search
CPC .... G06F 3/0656; G06F 3/0625; G06F 3/0647; G06F 3/0679; G06F 1/3275
See application file for complete search history.

(56) References Cited

U.S. PATENT DOCUMENTS

| | | | |
|---|---|---|---|
| 7,370,217 B2 * | 5/2008 | Weast | G06F 3/0611 713/320 |
| 2011/0276817 A1 * | 11/2011 | Fullerton | G06F 13/1668 713/320 |
| 2012/0089851 A1 * | 4/2012 | Ting | G06F 1/32 713/310 |
| 2012/0102344 A1 * | 4/2012 | Kocev | G06F 1/3287 713/322 |
| 2018/0107417 A1 * | 4/2018 | Shechter | G06F 3/0619 |
| 2018/0181186 A1 * | 6/2018 | Diefenbaugh | G06F 3/0656 |
| 2021/0271412 A1 * | 9/2021 | Cheong | G06F 3/0679 |

* cited by examiner

*Primary Examiner* — William E. Baughman
(74) *Attorney, Agent, or Firm* — Holland & Hart LLP

(57) ABSTRACT

Methods, systems, and devices for write buffer extensions for storage interface controllers are described. Apparatuses and methods are presented in which a buffer may be used to temporarily store data from an application if the memory device is in an INACTIVE power mode. This may allow the memory device to remain asleep. The buffer may be positioned on the host device so that the power mode of the memory device may not affect it. That way, data may be stored in the buffer without waking up the memory device. If the memory device is in an ACTIVE power mode, the data that has been temporarily stored in the buffer may be sent to the memory device for storage. During read operations, if the requested data is stored in the buffer, it may be used instead of data in the memory device.

20 Claims, 9 Drawing Sheets

WRITE BUFFER EXTENSIONS FOR STORAGE INTERFACE CONTROLLERS

CROSS REFERENCE

The present application for patent claims the benefit of U.S. Provisional Patent Application No. 63/277,354 by AMBULA et al., entitled "WRITE BUFFER EXTENSIONS FOR STORAGE INTERFACE CONTROLLERS," filed Nov. 9, 2021, assigned to the assignee hereof, and expressly incorporated by reference herein.

BACKGROUND

The following relates generally to one or more systems for memory and more specifically to write buffer extensions for storage interface controllers.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Many devices use non-volatile memory to store system or application data, and often put the non-volatile memory to sleep to save power when not in use. For example, a cell phone may put its non-volatile memory to sleep when no memory access occurs within an amount of time (e.g., milliseconds), or at night when the user is not using the cell phone. A memory that has been put to sleep is in an INACTIVE power mode in which memory access is not available. Once the memory is put to sleep, the memory must be awakened (e.g., put into an ACTIVE power mode) before data can be accessed thereon. Some applications require periodic access to data stored on the memory, even when the memory is asleep. For example, an application may periodically store a status or a log to memory every minute or so. But because the memory access is periodic, the memory may be put to sleep between each memory access. As a result, the memory must be awakened each time the application requires a memory access, which may consume additional power to do. Thus, ironically, putting the memory to sleep can waste power if the memory must be awakened often for periodic access.

Apparatuses and methods are presented in which a buffer may be used to temporarily store data from an application when a non-volatile memory device is asleep (in an INACTIVE power mode). This may allow the memory device to remain asleep so that no power is wasted in waking it up. The buffer may be positioned on the host device so that the power mode of the memory device may not affect it. That way, data may be stored in the buffer without waking up the non-volatile memory device. Later, when the non-volatile memory device is awake (in an ACTIVE power mode), the data that has been temporarily stored in the buffer may be sent to the non-volatile memory device for storage. During read operations, if the requested data is stored in the buffer, it may be used instead of data in the non-volatile memory device.

Figure 1:
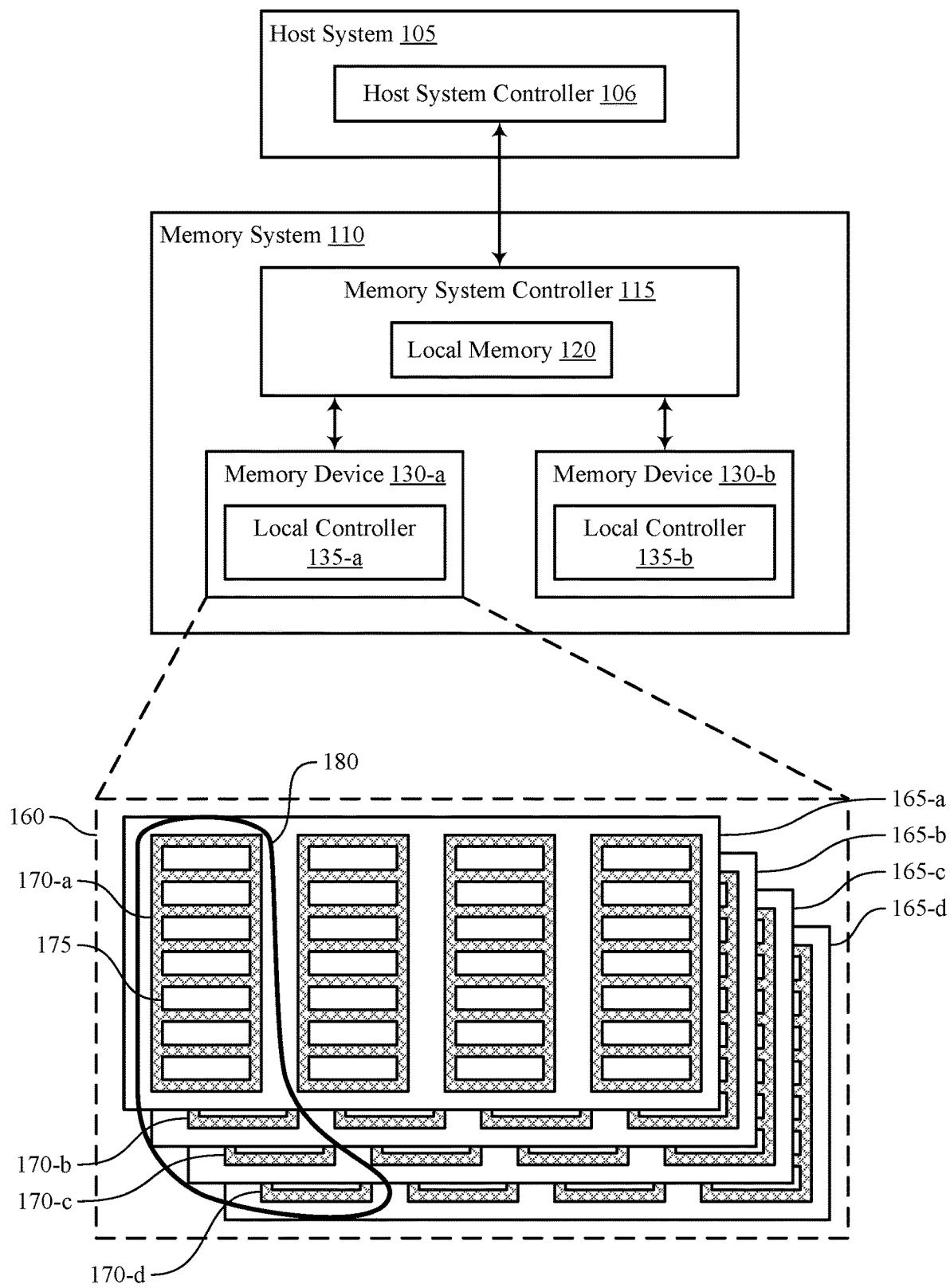
FIG. 1 illustrates an example of a system that supports write buffer extensions for storage interface controllers in accordance with examples as disclosed herein.
Figure 2:
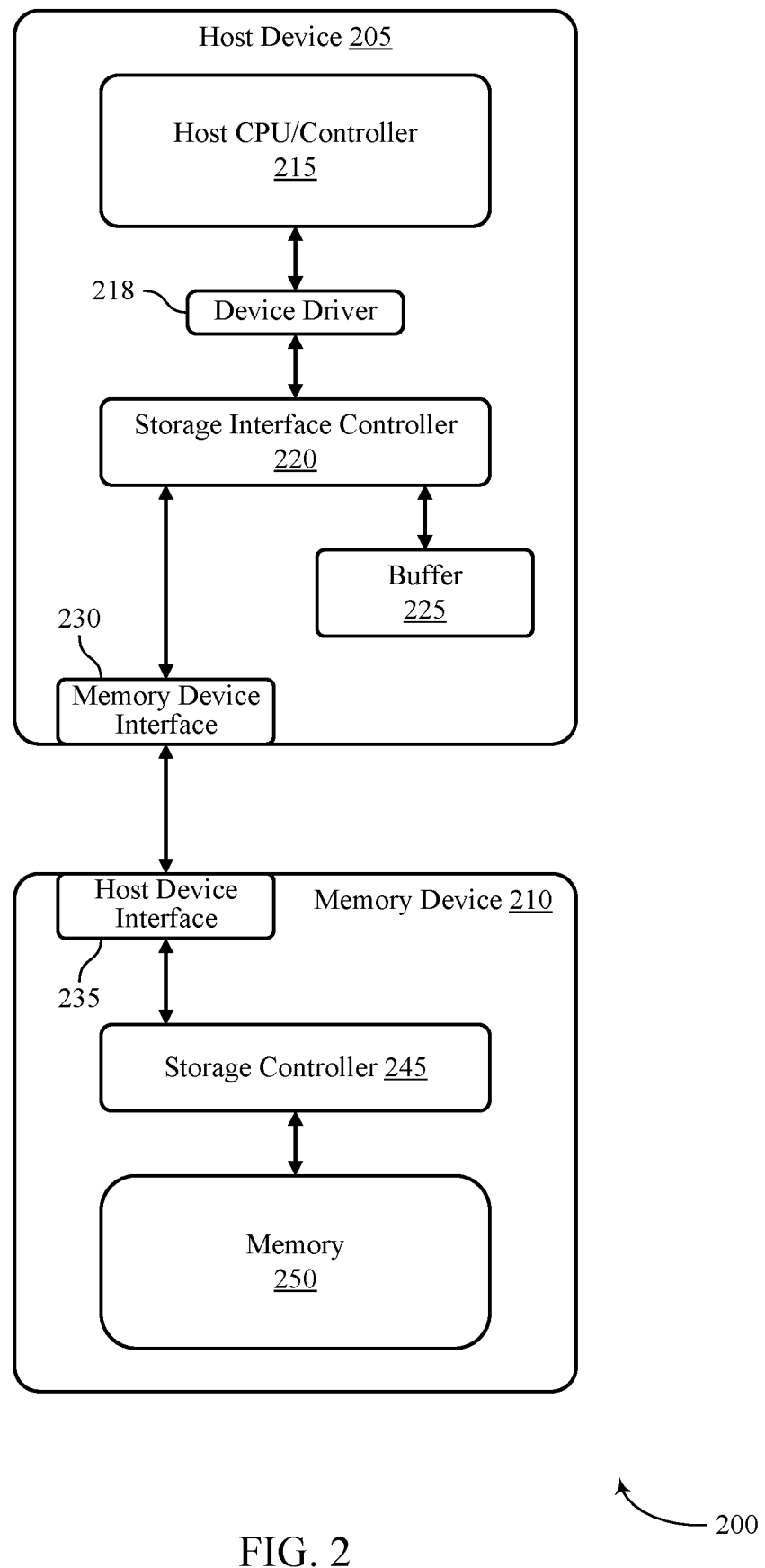
FIG. 2 illustrates an example of a system that supports write buffer extensions for storage interface controllers in accordance with examples as disclosed herein.

Features of the disclosure are initially described in the context of systems and devices with reference to FIGS. 1 and 2. Features of the disclosure are further described in the context of state diagrams and sets of operations with reference to FIGS. 3-5B. These and other features of the disclosure are further illustrated by and described in the context of an apparatus diagram and flowcharts that relate to write buffer extensions for storage interface controllers with reference to FIGS. 6-8.

FIG. 1 illustrates an example of a system 100 that supports write buffer extensions for storage interface controllers in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support write buffer extensions for storage interface controllers. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

FIG. 2 illustrates an example of a system 200 that supports write buffer extensions for storage interface controllers in accordance with examples as disclosed herein. The system 200 may be an example of a system 100 as described with reference to FIG. 1 or aspects thereof. The system 200 may include a memory device 210 configured to store data received from a host device 205 or to send data to the host device 205, when requested by the host device 205 using access commands (e.g., read commands or write commands). The system 200 may implement aspects of the system 100 as described with reference to FIG. 1. For example, the host device 205 may be an example of the host system 105 and the memory device 210 may be an example of the memory system 110 or a memory device 130.

The memory device 210 may be a non-volatile memory device, and may include one or more memories 250 as described with reference to FIG. 1. For example, the memory device 210 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM. Memories 250 may be or include one or more memory die.

The memory device 210 may additionally include a storage controller 245 configured to control the passing of data directly to and from the memory device 210, e.g., for storing data, retrieving data, and determining memory locations in which to store data and from which to retrieve data. The storage controller 245 may be configured to receive data access requests (e.g., read and write requests) from the host device 205 via a host device interface 235; store and retrieve data to and from memories 250 (e.g., NAND die), based on the requests; and send and receive data to and from the host device 205 via the host device interface 235. The memory device 210 may be in an ACTIVE power mode in which it can receive and process access commands (e.g., read and write commands) from the host device 205 and an INACTIVE power mode in which it may not process access commands until being transitioned to the ACTIVE power mode. The ACTIVE and INACTIVE power modes may each comprise various states, as discussed with respect to FIG. 3. The memory device 210 may transition from the ACTIVE power mode to the INACTIVE power mode based on commands from the host device 205 received via host device interface 235, or based on one or more timers expiring without receiving an access command. Storage controller 245 may effect the mode change, accordingly, as discussed with respect to the states of FIG. 3. For example, storage controller 245 may power up or power down various components of memory device 210, including host device interface 235, portions of the storage controller 245, voltage supplies, or memories 250.

The host device 205 may include a host CPU/controller 215 configured to execute host applications. The applications may use data that may be stored at the memory device 210. To access the memory device 210, a storage interface controller 220 may be used. An application may invoke one or more software routines (e.g., calls) of a device driver 218 associated with the storage interface controller 220 (e.g., using an application layer or a service layer) to store or obtain data corresponding to a virtual address space. Based on the invoked software routines of the associated device driver 218, the storage interface controller 220 may be configured to perform read and write commands at lower communication layers by communicating with the memory device 210 via memory device interface 230. The memory device interface 230 may be coupled with the host device interface 235 of the memory device 210 and configured to pass requests and data, as well as other control signals, (e.g., state change commands), therebetween. The storage interface controller 220 may access the memory device 210 according to a logical address space that may be the same or different as the virtual address space. For example, the storage interface controller 220 may translate one or more virtual address spaces used by the applications to a logical address space of the memory device 210.

Figure 3:
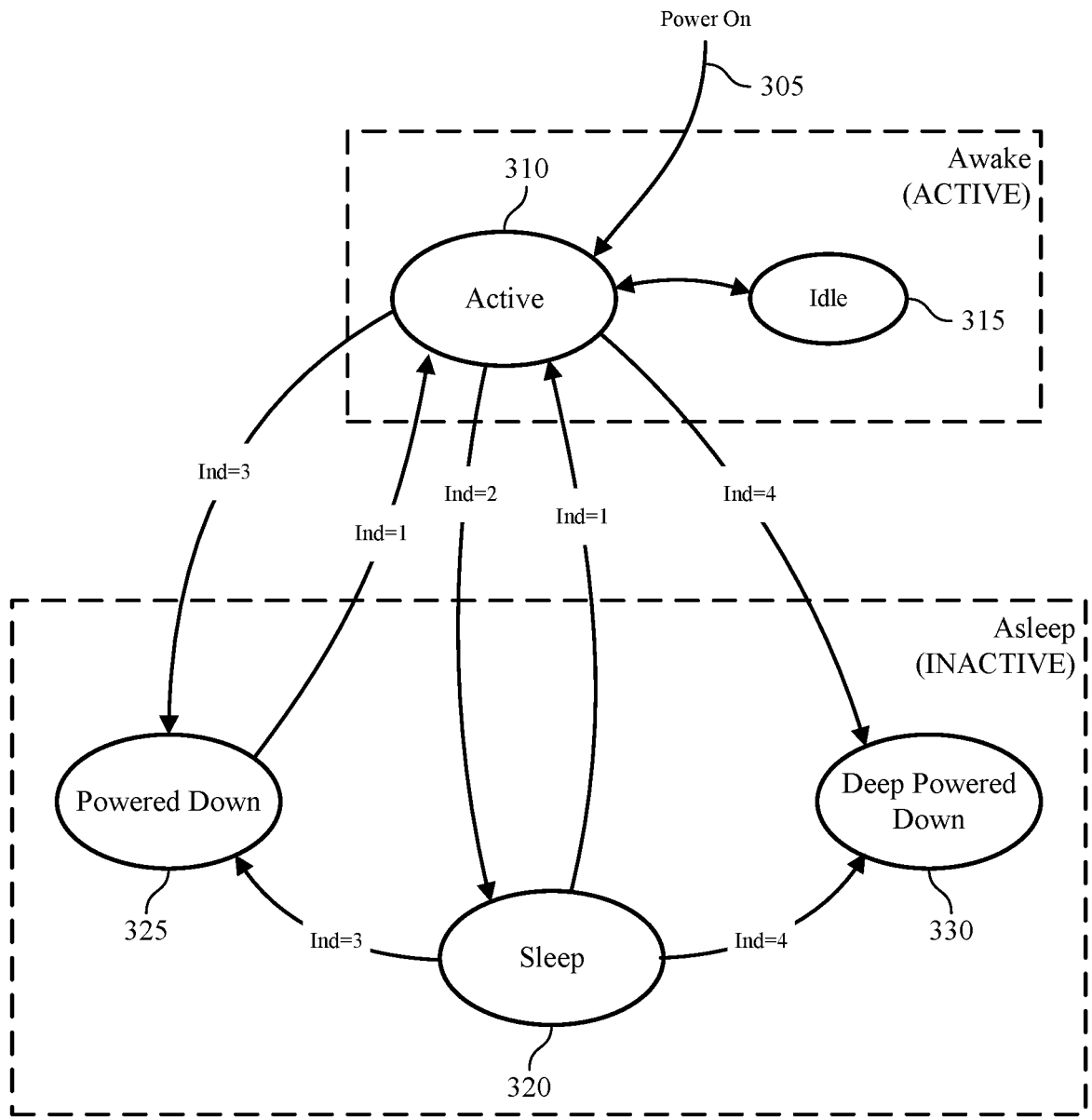
FIG. 3. shows an example of a power mode state diagram that supports write buffer extensions for storage interface controllers in accordance with examples as disclosed herein.

In some examples, the storage interface controller 220 may control power modes and states of the memory device 210, as discussed in FIG. 3. In some examples, the storage interface controller 220 may be a universal flash storage (UFS) controller.

The host device 205 may further include a buffer 225 coupled with the storage interface controller 220. The storage interface controller 220 may be configured to store and obtain data at lower communication layers using the buffer 225 in certain situations in which the memory device may be asleep. Because the buffer 225 may be on the host device 205, the buffer 225 may be available to the storage interface controller 220, even if the memory device 210 may be asleep. In some examples, the buffer 225 may be physically separated from the storage interface controller 220. In some examples, the buffer 225 may be positioned on or otherwise incorporated into the storage interface controller 220. In some examples, the buffer 225 may be in a portion of the memory (e.g., volatile memory) on the host device 205, but maintained in a separate region (e.g., may be allocated specifically for use by the storage interface controller 220). The applications and host CPU/controller 215 may also use the memory on host device 205, but may not have direct access to the buffer 225. The buffer 225 may also be referred to herein as a write buffer.

To store data received from an application of the host CPU/controller 215 (e.g., when invoked by the device driver), the storage interface controller 220 may send the application data and associated virtual address to the memory device 210 (e.g., via a write command) if the memory device is awake (e.g., in an ACTIVE power mode). If the memory device 210 is asleep (e.g., in an INACTIVE power mode), the storage interface controller 220 may store the application data in the buffer 225. If the buffer 225 is full (e.g., does not have sufficient available space to store the data), the storage interface controller 220 may first wake up the memory device (e.g., put the memory device into the ACTIVE state) and then send the data and a logical address of the data to the memory device. Along with the application data, the storage interface controller 220 may also send (e.g., move or transfer) to the memory device 210 (e.g., via a write command) data and associated logical addresses that have been stored in the buffer 225. In some examples, the buffer data and logical addresses may be sent automatically to the memory device 210 whenever the memory device becomes awake.

To retrieve data for an application of the host CPU/controller 215 (e.g., when invoked by the device driver), the storage interface controller 220 may determine whether to obtain the requested data from the buffer 225 (e.g., if the data is stored therein), or from the memory device 210 (e.g., via a read command), waking up the memory device 210 first if it is asleep.

FIG. 3 shows an example of a power mode state diagram 300 that supports write buffer extensions for storage interface controllers in accordance with examples as disclosed herein. The power mode state diagram 300 may apply to memory device 210, which may be an example of a memory device described with reference to FIG. 2. For purposes of this discussion, the memory device 210 of FIG. 2 will be used, including the memory 250, the storage controller 245, and the host device interface 235, although any type of memory device may be used. In some examples, power mode state diagram 300 may illustrate an example set of power states associated with a memory device to support write buffer extensions for storage interface controllers. For example, power mode state diagram 300 depicts power states of the memory device during operation of a host device. In some examples, the storage controller 245 controls the power states of the memory device.

The memory device may be "awake" or "asleep," as shown in power mode state diagram 300. An active state 310 and an idle state 315 may correspond to the memory device being awake. A sleep state 320, a powered down state 325, and a deep powered down state 330 may correspond to the memory device being asleep. More or less power states may alternatively correspond to the memory device being awake or asleep. When the memory device is awake, it may be considered to be in an ACTIVE power mode. That is, if the memory device is in the active state 310 or the idle state 315, the memory device may be considered to be awake and in an ACTIVE power mode. If the memory device is asleep, it may be considered to be in an INACTIVE power mode. That is, if the memory device is in the sleep state 320, the powered down state 325, or the deep powered down state 330, the memory device may be considered to be asleep and in an INACTIVE power mode. To wake up the memory device means to put the memory device into one of the power states corresponding to the ACTIVE power mode. To put the memory device to sleep means to put the memory device into one of the power states corresponding to the INACTIVE power mode.

The memory device may be commanded to any of the power states by the host device (e.g., by storage interface controller 220 of host device 205). In some cases, the host device may send a command to change states along with an indication of the state to enter to the storage controller 245 (e.g., via memory device interface 230 and host device interface 235). For example, the storage interface controller 220 may send a command to change states to the memory device with a state indicator (Ind) of "1", "2", "3", or "4". The storage controller 245 may receive the command and transition the memory device to the active state 310, the sleep state 320, the powered down state 325, or the deep powered down state 330, respectively.

If the memory device is awake, the three memory device components (e.g., the memory 250, the storage controller 245, and the host device interface 235) may have power. As such, the memory device may be ready for reading or writing memory upon receiving requests from the host device (e.g., from the storage interface controller 220).

In the active state 310, the memory device may be processing a read or write command received from the host device (e.g., from the storage controller 245). In the idle state 315, the memory device may not be processing a read or write command from the host device but may be ready to receive such a request. In some cases, the memory device may move automatically between the idle state 315 and the active state 310, depending on whether a read or write command is being processed. On initial power up 305, the memory device may wake up in the active state 310 or the idle state 315. In some cases, the memory device may generally remain awake (e.g., in the active state 310 or the idle state 315) if the memory device is in continuous use.

In some examples, the memory device may be put to sleep by the host device (e.g., via the memory device interface 230 and the host device interface 235) during times of little or no use. In some examples, expiration of a timer may be employed to put the memory device to sleep. For example, a timer may expire if no commands are received within a certain amount of time, causing the memory to be put to sleep automatically. While asleep, power to one or more of the three memory device components (e.g., the memory 250, the storage controller 245, or the host device interface 235) may be removed or reduced (e.g., by the storage controller 245) to save power.

In the sleep state 320, the power to the memory of the memory device may be removed or reduced, while the storage controller and host device interface may continue to have power. While the memory device is in the sleep state 320, the storage controller may determine when a request to change state is received from the host device and may effect the change, accordingly. For example, to awaken the memory device (e.g., transition the memory device to the active state 310), the storage controller may power up the memory of the memory device. The storage controller may process information received from the host device via the host device interface as the memory is powering up. If a read or write command is then received by the memory device, the storage controller may access the memory.

In the powered down state 325, power to both the storage controller (e.g., at least portions of the storage controller) and the memory may be removed or reduced, while the host device interface may continue to have power. While the memory device is in the powered down state 325, the storage controller may determine when a request to change state is received from the host device (e.g., via the host device interface) and may effect the change, accordingly. For example, to awaken the memory device (e.g., transition the memory device to the active state 310), the storage controller may power up any portions of the memory or storage controller that were powered down. Once the storage controller is powered up, it may process information received from the host device via the host device interface. If a read or write command is then received by the memory device, the storage controller may access the memory.

In the deep powered down state 330, power to the storage controller, the memory, and the host device interface may be removed or reduced. Without power, the host device interface may not forward a request to change state to the storage controller when the request is received from the host device. Thus, the storage controller may not effect a state change (e.g., the host device interface may not power up the components of the memory device) while in the deep powered down state 330. As a result, the memory device may not be directly awakened (e.g., directly transition to the active state 310) from the deep powered down state 330; to awaken the memory device from the deep powered down state 330 (e.g., to transition the memory device back to the active state 310), a typical power cycling of the memory device may be performed.

In some examples, the power states of the power mode state diagram 300 may correspond to UFS power mode states. For example, the sleep state 320, the powered down state 325, and the deep powered down state 330 may correspond to a UFS-Sleep state, a UFS-PowerDown state, and a UFS-DeepSleep state, respectively.

Figure 4A:
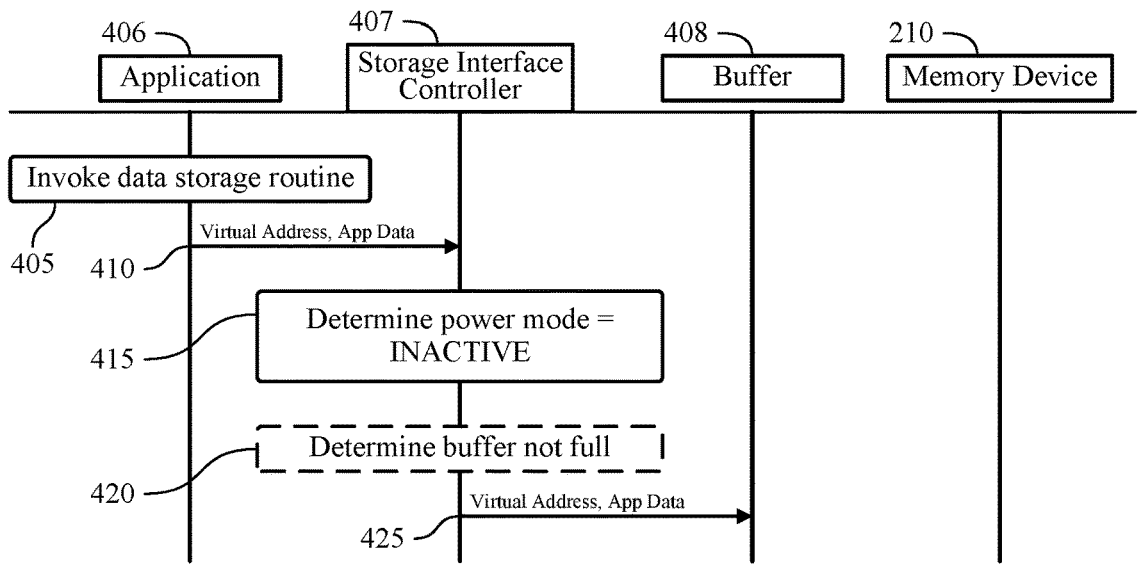
FIGS. 4A-4C illustrate example sets of operations for writing data that support write buffer extensions for storage interface controllers in accordance with examples as disclosed herein.
Figure 4B:
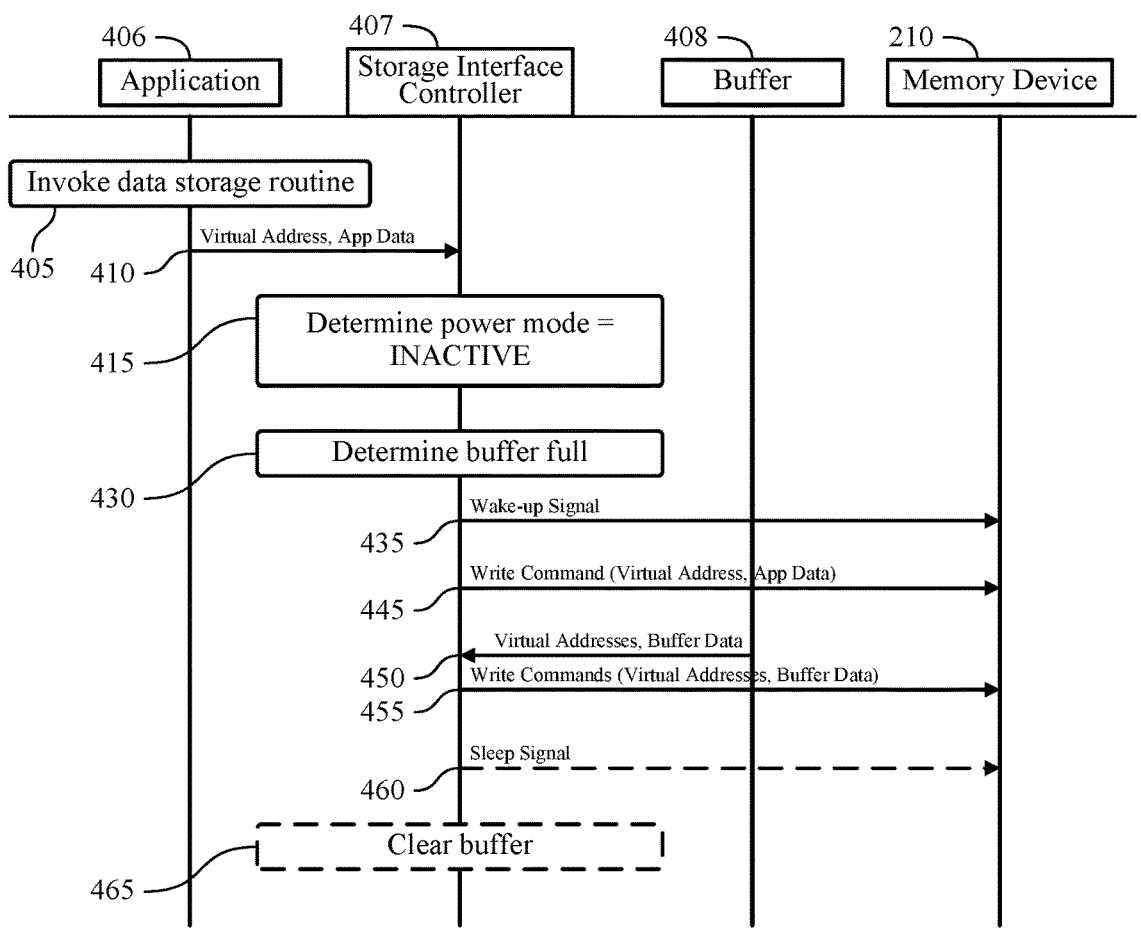
Figure 4C:
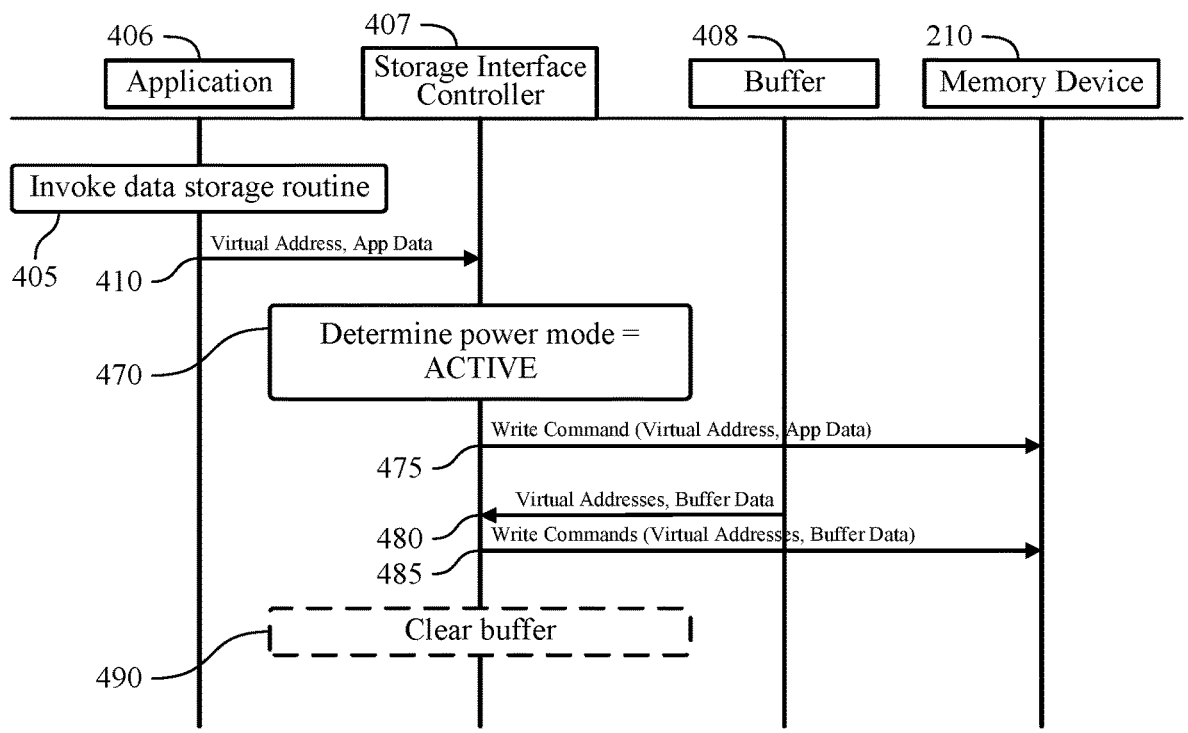

FIGS. 4A-4C illustrate example sets of operations for writing data that support write buffer extensions for storage interface controllers in accordance with examples as disclosed herein. Process flows 401, 402, and 403 may be performed by host device 205 and memory device 210, which may be respective examples of a host device and memory device described with reference to FIG. 2. The operations associated with an application 406, a storage interface controller 407, and a buffer 408 may be performed at the host device 205 by the host CPU/controller 215, the storage interface controller 220, and the buffer 225, respectively. In some examples, process flows 401, 402, and 403 may illustrate an example sequence of operations performed to support write buffer extensions for storage interface controllers. For example, process flows 401, 402, and 403 depict operations for writing data associated with a write command to either a buffer at the host, or a memory device, depending on whether the memory device is awake or asleep.

Using process flows 401, 402, and 403, a software routine to store data may be invoked by an application of a host CPU/controller, and may be processed by a storage interface controller such that the application data may be sent to a buffer for temporary storage if the memory device is asleep or to a memory device if the memory device is awake or the buffer is full (e.g., does not have sufficient available space to store the data). The memory device may be awakened first if it is asleep. Along with the application data, data that has been stored in the buffer may be transferred to the memory device.

The operations described in each process flow 401, 402, and 403 may be performed earlier or later in the process; may be omitted, replaced, or supplemented; or may be combined with another operation in the process. Also, additional operations described herein that are not included in process flows 401, 402, and 403 may be included.

Turning to process flow 401, at block 405 a software routine to store data may be invoked by an application 406 executing on the host device. In some examples, the software routine may be a call to a device driver of a storage interface controller 407.

At arrow 410, the application data and associated virtual address may be made available to the storage interface controller 407 (e.g., using an application layer or a service layer) by or in response to the invoked routine. In some examples, the virtual address may correspond to a logical address of the application data. Alternatively, the storage interface controller 407 may perform address translation from one or more virtual address spaces used by the applications to a logical address space of the memory device 210.

At block 415, upon the software routine being invoked by the application, the storage interface controller 407 may determine that the memory device 210 is in an INACTIVE power mode (e.g., is asleep or in the sleep state 320, the powered down state 325, or the deep powered down state 330, as discussed with respect to FIG. 3). In some cases, to determine the power mode of the memory device 210, the storage interface controller 407 may query the memory device 210 via an interface circuit (e.g., memory device interface 230 and host device interface 235). Alternatively, storage interface controller 407 may maintain an indicator of the current power mode of the memory device 210.

At arrow 425, upon determining that the memory device 210 is in the INACTIVE power mode, the storage interface controller 407 may store the application data received from the application in the buffer 408. The application data may be temporarily stored in the buffer 408 until the data can be moved (e.g., written) to the memory device 210 when the memory device 210 is in the ACTIVE power mode, as discussed with reference to process flows 402 and 403. The associated virtual (or logical) address may also be stored in the buffer 408. In some examples, the associated virtual or logical address may be stored with the application data in the buffer 408. Alternatively, the associated virtual or logical address may be stored in a table that points to the location in the buffer in which the application data is stored. In some cases, the storage interface controller 407 may notify the device driver that the invoked routine is complete. Thus, the application 406 may proceed according to the successful operation of the invoked routine to the device driver associated with the storage interface controller 407.

In some cases, as shown at block 420, the storage interface controller 407 may first determine whether the buffer 408 is full (e.g., does not have sufficient available space to store the application data) before deciding whether to temporarily store the data in the buffer 408, and may temporarily store the data in the buffer 408 if the buffer 408 is not full (process flow 402 describes operations that may be performed if the buffer 408 is full). In some cases, the storage interface controller 407 may determine whether the buffer 408 is full based on a threshold. In some cases, the storage interface controller 407 may determine that the buffer 408 is not full by determining that the buffer 408 has sufficient space for the application data. In some cases, the storage interface controller 407 may determine that the buffer 408 is not full by determining that the amount of data stored in the buffer 408 does not satisfy (e.g., is less than) the threshold.

Turning to process flow 402, at block 430, upon obtaining the application data from the application 406 (as discussed in process flow 401 at arrow 410) and determining that the memory device 210 is in an INACTIVE power mode (as discussed in process flow 401 at block 415), the storage interface controller 407 may determine that the buffer 408 is full. In some cases, the storage interface controller 407 may determine that the buffer 408 is full by determining that the buffer 408 does not have sufficient space for the application data. In some cases, the storage interface controller 407 may determine whether the buffer 408 is full based on a threshold. In some cases, the storage interface controller 407 may determine that the buffer 408 is full by determining that the amount of data stored in the buffer 408 satisfies (e.g., is greater than or equal to) the threshold.

At arrow 435, upon determining that the buffer 408 is full, the storage interface controller 407 may wake up the memory device 210 by putting the memory device 210 in an ACTIVE power mode. In some cases, the storage interface controller 407 may send a wake-up signal (e.g., a request to change to the active state 310, as discussed with respect to FIG. 3) to the memory device 210 (e.g., via memory device interface 230 and host device interface 235) to move the memory device 210 to the ACTIVE power mode (e.g. to the active state 310). This may cause the memory device 210 to wake up and move to the ACTIVE power mode. In some examples, in response to the wake-up signal, the memory device 210 may send an indicator to the storage interface controller 407 if the memory device 210 is awake and in the ACTIVE power mode. In some cases, the storage interface controller 407 may receive the indicator via memory device interface 230.

At arrow 445, after waking up the memory device 210 (putting the memory device in the ACTIVE power mode), the storage interface controller 407 may send (e.g., via a write command) the application data and associated logical address to the memory device 210 to store the application data. In some cases, the write command may be sent to the memory device 210 via an interface circuit (e.g., memory device interface 230 and host device interface 235). The memory device may map the logical address to a physical address in the memory of the memory device 210 and store the data at the physical address.

At arrows 450 and 455, the storage interface controller 407 may retrieve data that has been temporarily stored in the buffer 408 and send the buffer data to the memory device 210 for storage (e.g., via one or more write commands). In some cases, one or more write commands may be sent to the memory device 210 via an interface circuit (e.g., memory device interface 230 and host device interface 235) along with the buffer data and associated virtual (e.g., logical) addresses. The memory device 210 may map the logical addresses to physical addresses in the memory of the memory device 210 and store the buffer data at the physical addresses. In some cases, the storage interface controller 407 may retrieve the data from the buffer 408 and send the buffer data to the memory device 210. In some cases, the data may be sent to the memory device 210 directly from the buffer 408, bypassing the storage interface controller 407. The buffer data may be sent to the memory device 210 before or after the application data. In some cases, if the buffer data is sent to the memory device 210 after the application data, the storage interface controller 407 may remove (e.g., not send to the memory device) buffer data associated with the same logical address as the application data. That way, older buffer data may not overwrite newer application data that was just stored in the memory device 210.

At arrow 460, after the buffer data and the application data have been sent to the memory device 210, the storage interface controller 407 may optionally put the memory device 210 to sleep. In some cases, the storage interface controller 407 may send a sleep signal to the memory device 210 (e.g., via memory device interface 230 and host device interface 235) to move the memory device 210 to the INACTIVE power mode (e.g. the sleep state 320, the powered down state 325, or the deep powered down state 330, as discussed with respect to FIG. 3). In some cases, the storage interface controller 407 may command the memory device 210 to move to the power state the memory device 210 was in before the storage interface controller 407 awakened the memory device 210. Alternatively, the storage interface controller 407 may refrain from putting to sleep the memory device 210 (e.g., allow the memory device to remain awake in the ACTIVE power mode).

At optional block 465, the buffer 408 may be cleared of the data that was sent to the memory device 210 to be stored. Otherwise, the buffer data may remain in the buffer 408, but may be overwritten by new data as the new data is subsequently written to the buffer 408.

Turning to process flow 403, at block 470, upon obtaining the application data from the application 406 (as discussed in process flow 401 at arrow 410), the storage interface controller 407 may determine that the memory device 210 is in an ACTIVE power mode (e.g., is awake, in the active state 310, or the idle state 315) instead of an INACTIVE power mode. In some cases, to determine the power mode of the memory device 210, the storage interface controller 407 may query the memory device 210 via an interface circuit (e.g., memory device interface 230 and host device interface 235).

At arrow 475, upon determining that the memory device 210 is in the ACTIVE power mode, the storage interface controller 407 may send the application data (e.g., via a write command) to the memory device 210. The write command may include the application data and the associated logical address. In some cases, the write command may be sent to the memory device 210 via the interface circuit. The memory device 210 may map the logical address to a physical address in the memory of the memory device 210 and store the data at the physical address.

At arrows 480 and 485, the storage interface controller 407 may retrieve data that has been temporarily stored in the buffer 408 and send the buffer data to the memory device 210 for storage in a similar manner as discussed at arrows 450 and 455. As discussed at arrows 450 and 455, the buffer data may be sent to the memory device 210 before or after the application data.

At optional block 490, the buffer 408 may be cleared of the data that was sent to the memory device to be stored. Alternatively, the buffer data may remain in the buffer 408, but may be overwritten by new data as the new data is subsequently written to the buffer 408.

Figure 5A:
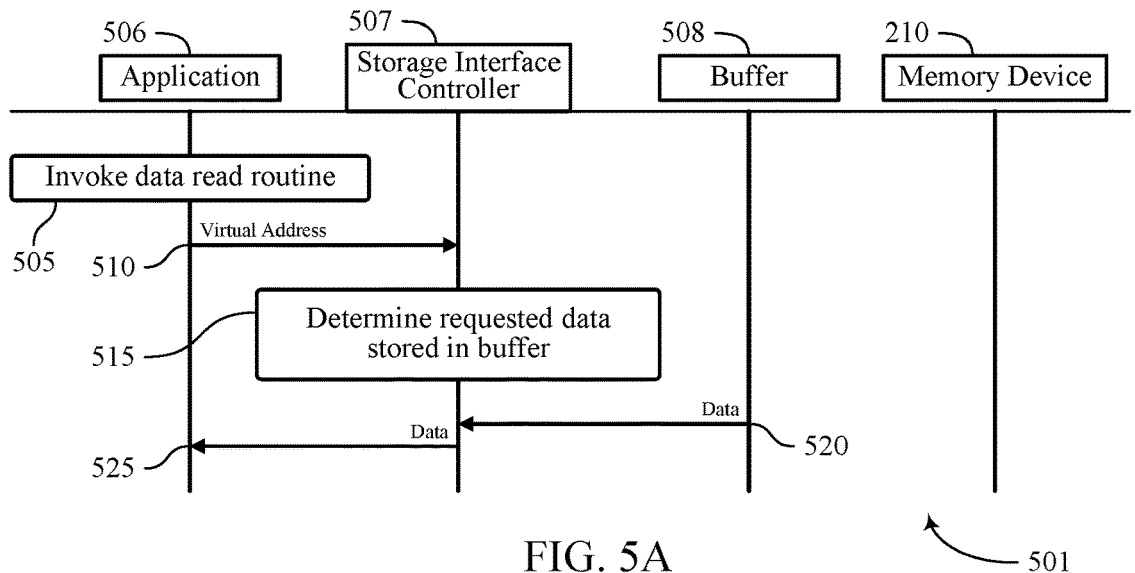
FIGS. 5A-5B illustrate example sets of operations for reading data that support write buffer extensions for storage interface controllers in accordance with examples as disclosed herein.
Figure 5B:
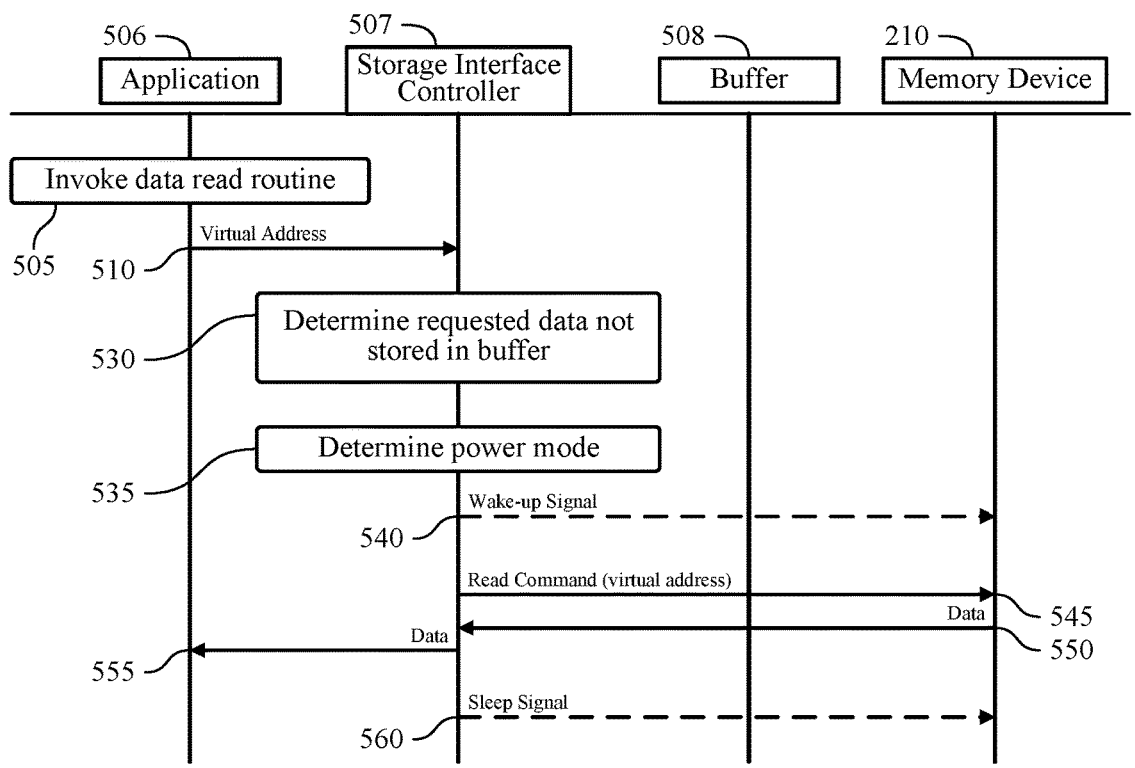

FIGS. 5A-5B illustrate example sets of operations for reading data that support write buffer extensions for storage interface controllers in accordance with examples as disclosed herein. Process flows 501 and 502 may be performed by host device 205 and memory device 210, which may be respective examples of a host device and memory device described with reference to FIG. 2. The operations associated with an application 506, a storage interface controller 507, and a buffer 508 may be performed at the host device 205 by the host CPU/controller 215, the storage interface controller 220, and the buffer 225, respectively. In some examples, process flows 501 and 502 may illustrate an example sequence of operations performed to support write buffer extensions for storage interface controllers. For example, process flows 501 and 502 depict operations for reading data, associated with a read command, from either a buffer at the host or a memory device, depending on whether the memory device is awake or asleep.

Using process flows 501 and 502, a software routine to obtain data may be invoked by an application of a host CPU/controller, and may be processed by a storage interface controller such that the requested data may be obtained from the buffer, if stored therein, or from the memory device. If the requested data is not in the buffer, the memory device may be awakened first if it is asleep before obtaining the data from the memory device.

The operations described in each process flow 501 and 502 may be performed earlier or later in the process; may be omitted, replaced, or supplemented; or may be combined with another operation in the process. Also, additional operations described herein that are not included in process flows 501 and 502 may be included.

Turning to process flow 501, at block 505, a software routine to obtain data may be invoked by an application 506 executing on the host device. In some examples, the software routine may be a call to a device driver of a storage interface controller 220.

At arrow 510, the virtual address associated with the application data may be made available to the storage interface controller 507 (e.g., using an application layer or a service layer) by or in response to the invoked routine. In some examples, the virtual address may correspond to a logical address of the memory device 210, or the storage interface controller 507 may translate the virtual address to the logical address.

At block 515, upon the software routine being invoked by the application 506, the storage interface controller 507 may determine that the requested data is stored in the buffer 508. In some examples, the storage interface controller 507 may determine that the requested data is stored in the buffer 508 by determining that data associated with the virtual (or logical) address for the read routine is stored in the buffer 508. In some examples, the associated virtual or logical address may be stored with the data in the buffer 408. Alternatively, the associated virtual or logical address may be stored in a separate table (e.g., in the buffer 508) that points to the location in the buffer 508 in which the data is stored.

At arrow 520, upon determining that the requested data is temporarily stored in the buffer 508, the storage interface controller 507 may obtain the requested data from the buffer 508. In some examples, the storage interface controller 507 may obtain the requested data by obtaining data from the buffer 508 that is associated with the virtual (or logical) address associated with the requested data.

At arrow 525, the storage interface controller 507 may make the obtained data available to the application 506. In some examples, the storage interface controller 507 may make the requested data available to the application 506 using an application layer or a service layer (e.g., via the device driver).

Turning to process flow 502, at block 530, upon obtaining the virtual address from the application 506 (as discussed in process flow 501 at arrow 510), the storage interface controller 507 may determine that the requested data is not temporarily stored in the buffer 508. In some examples, the storage interface controller 507 may determine that the requested data is not stored in the buffer 508 by determining that the virtual (or logical) address associated with the read routine is not stored in the buffer 508.

At block 535, upon determining that the requested data is not temporarily stored in the buffer 508, the storage interface controller 507 may determine whether the memory device 210 is in an ACTIVE power mode (e.g., in the active state 310, or the idle state 315) or in an INACTIVE power mode (e.g. in the sleep state 320, the powered down state 325, or the deep powered down state 330). In some cases, to determine the power mode of the memory device 210, the storage interface controller 507 may query the memory device 210 via an interface circuit (e.g., memory device interface 230 and host device interface 235).

At arrow 540, if the storage interface controller 507 determines at block 535 that the memory device 210 is in the INACTIVE power mode, the storage interface controller 507 may wake up the memory device 210 to put the memory device 210 in an ACTIVE power mode, in a similar manner as discussed at arrow 435 of process flow 402. Alternatively, if the storage interface controller 507 determines at block 535 that the memory device 210 is in the ACTIVE power mode (e.g., is awake, in the active state 310, or idle state 315), the storage interface controller 507 may skip this operation. That is, if the memory device 210 is already awake, the storage interface controller 507 may refrain from waking up the memory device 210.

At arrow 550, once the memory device 210 is awake (in the ACTIVE power mode), the storage interface controller 507 may obtain the requested data from the memory device 210. In some examples, the storage interface controller 507 may obtain the requested data by sending a read command to the memory device 210 and then receiving the data from the memory device 210. The read command may include the logical address associated with the requested data.

At arrow 555, the storage interface controller 507 may make the obtained data available to the application 506. In some examples, the storage interface controller 507 may make the requested data available to the application 506 using an application layer or a service layer (e.g., via the device driver).

At arrow 560, after the storage interface controller 507 has obtained the requested data from the memory device 210, the storage interface controller 507 may optionally put the memory device 210 back to sleep (put into the INACTIVE power mode), as discussed at arrow 460 of FIG. 4B. Alternatively, the storage interface controller 507 may refrain from putting the memory device 210 to sleep.

Process flows 501 and 502 may include further operations not shown therein. For example, after the memory device 210 has been awakened to the ACTIVE power mode, data temporarily stored in the buffer 508 may be sent to the memory device 210 for storage. After the requested data has been made available to the application 506 at 555, the storage interface controller 507 may retrieve data that has been temporarily stored in the buffer 508 and send the buffer data to the memory device 210 for storage in a similar manner as discussed at arrows 450 and 455 of FIG. 4B.

In some examples, the buffer 508 may not be addressable according to the virtual or logical address of the data. (e.g., may not have the capability of a cache or content-addressable memory that can be queried by associated address). In those cases, to determine if the data is in the buffer, each address of the buffer may need to be reviewed, which could be relatively slow. But if the memory device 210 is already awake, data stored in the buffer 508 may have already been moved to the memory device 210, so reviewing the buffer may be unnecessary. So if the memory device 210 is awake, it may be faster for the storage interface controller 507 to obtain the data from the memory device 210 without first determining if the data is in the buffer 508. This may speed up the obtaining of the data from the memory device 210.

So in some examples, upon obtaining the virtual address, the storage interface controller 507 may bypass reviewing the buffer 508 (block 515 or block 530) and first determine the power mode of the memory device 210 (block 535). If the determined power mode is an ACTIVE power mode, the storage interface controller 507 may obtain the data from the memory device 210 (arrows 545 and 550). If the determined power mode is an INACTIVE power mode, the storage interface controller 507 may then review the buffer 508. If the requested data is stored in the buffer 508 (block 515), the storage interface controller 507 may obtain the data from the buffer 508 (arrow 520). If the requested data is not stored in the buffer 508, (block 530), the storage interface controller 507 may wake up the memory device 210 (arrow 540), and obtain the data from the memory device 210 (arrows 545 and 550).

Figure 6:
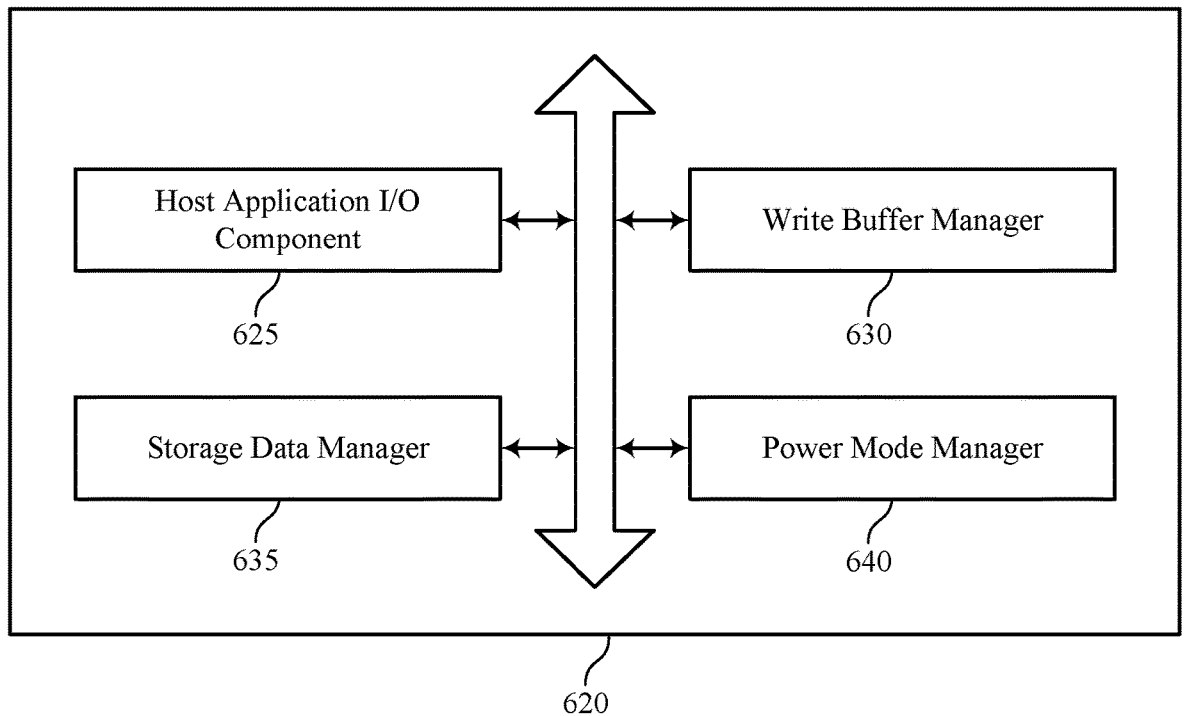
FIG. 6 shows a block diagram of a memory device that supports write buffer extensions for storage interface controllers in accordance with examples as disclosed herein.

FIG. 6 shows a block diagram 600 of a memory device 620 that supports write buffer extensions for storage interface controllers in accordance with examples as disclosed herein. The memory device 620 may be an example of aspects of a memory device as described with reference to FIGS. 1 through 5. The memory device 620, or various components thereof, may be an example of means for performing various aspects of write buffer extensions for storage interface controllers as described herein. For example, the memory device 620 may include a host application I/O component 625, a write buffer manager 630, a storage data manager 635, a power mode manager 640, or any combination thereof. Each of these components may communicate, directly or indirectly, with one another (e.g., via one or more buses).

The host application I/O component 625 may be configured as or otherwise support a means for receiving, by a storage interface controller of a host device, data to write to a storage device. The write buffer manager 630 may be configured as or otherwise support a means for storing, by the storage interface controller, the data to a write buffer of the storage interface controller, based at least in part on a power mode of the storage device. The write buffer manager 630 may be configured as or otherwise support a means for retrieving, by the storage interface controller from the write buffer, the data based at least in part on a change to the power mode of the storage device. The storage data manager 635 may be configured as or otherwise support a means for sending, by the storage interface controller, the data to the storage device.

In some examples, the power mode manager 640 may be configured as or otherwise support a means for determining, by the storage interface controller upon receiving the data, whether the power mode of the storage device is an inactive power mode. In some examples, the write buffer manager 630 may be configured as or otherwise support a means for storing, by the storage interface controller, the data to the write buffer based at least in part on determining that the power mode of the storage device is the inactive power mode. In some examples, the power mode manager 640 may be configured as or otherwise support a means for refraining from waking up the storage device based at least in part on determining that the power mode of the storage device is the inactive power mode.

In some examples, to support moving the data from the write buffer to the storage device, the power mode manager 640 may be configured as or otherwise support a means for determining, by the storage interface controller, whether the power mode of the storage device has changed to an active power mode. In some examples, to support moving the data from the write buffer to the storage device, the storage data manager 635 may be configured as or otherwise support a means for moving, by the storage interface controller, the data from the write buffer to the storage device based at least in part on determining that the power mode of the storage device has changed to the active power mode.

In some examples, storing the data to the write buffer may also be based at least in part on an amount of additional data stored in the write buffer.

In some examples, the write buffer manager 630 may be configured as or otherwise support a means for determining, by the storage interface controller upon receiving additional data to write to the storage device, whether an amount of data stored in the write buffer satisfies a threshold. In some examples, the power mode manager 640 may be configured as or otherwise support a means for determining, by the storage interface controller, whether the power mode of the storage device is an inactive power mode. In some examples, the power mode manager 640 may be configured as or otherwise support a means for waking up the storage device, by the storage interface controller, based at least in part on determining that the power mode of the storage device is the inactive power mode and determining that the amount of data stored in the write buffer satisfies the threshold, wherein moving the data from the write buffer to the storage device is performed subsequent to waking up the storage device. In some examples, the power mode manager 640 may be configured as or otherwise support a means for commanding the storage device back to the inactive power mode after moving the data from the write buffer to the storage device.

In some examples, the host application I/O component 625 may be configured as or otherwise support a means for receiving, at the storage interface controller from an application of the host device, a request to read data associated with an address of the storage device. In some examples, the write buffer manager 630 may be configured as or otherwise support a means for determining, by the storage interface controller, whether data associated with the address is stored in the write buffer. In some examples, the write buffer manager 630 may be configured as or otherwise support a means for retrieving from the write buffer, by the storage interface controller, the data associated with the address based at least in part on determining that the data associated with the address is stored in the write buffer. In some examples, the host application I/O component 625 may be configured as or otherwise support a means for sending, by the storage interface controller to the application of the host device, the data associated with the address.

In some examples, the host application I/O component 625 may be configured as or otherwise support a means for receiving, at the storage interface controller from an application of the host device, a request to read data associated with an address of the storage device. In some examples, the write buffer manager 630 may be configured as or otherwise support a means for determining, by the storage interface controller, that data associated with the address is not stored in the write buffer. In some examples, the storage data manager 635 may be configured as or otherwise support a means for retrieving from the storage device, by the storage interface controller, the data associated with the address. In some examples, the host application I/O component 625 may be configured as or otherwise support a means for sending, by the storage interface controller to the application of the host device, the data associated with the address.

In some examples, the power mode manager 640 may be configured as or otherwise support a means for determining, by the storage interface controller, whether the power mode of the storage device is an inactive power mode. In some examples, the power mode manager 640 may be configured as or otherwise support a means for waking up the storage device, by the storage interface controller, based at least in part on determining that the power mode of the storage device is the inactive power mode, wherein retrieving the data associated with the address from the storage device is performed subsequent to waking up the storage device. In some examples, the power mode manager 640 may be configured as or otherwise support a means for commanding the storage device back to the inactive power mode subsequent to retrieving the data associated with the address from the storage device.

The host application I/O component 625 may be configured as or otherwise support a means for receiving, by a storage interface controller of a host device, a plurality of data sets to write to a storage device, the host device comprising a write buffer associated with the storage interface controller. The power mode manager 640 may be configured as or otherwise support a means for determining, upon receipt of each data set of the plurality of data sets by the storage interface controller, a power mode of the storage device. The write buffer manager 630 may be configured as or otherwise support a means for storing, by the storage interface controller, the respective data set in the write buffer associated with the storage interface controller, based on the determined power mode of the storage device being an inactive power mode. The power mode manager 640 may be configured as or otherwise support a means for refraining, by the storage interface controller, from waking up the storage device, based on the determined power mode of the storage device being an inactive power mode. The write buffer manager 630 may be configured as or otherwise support a means for retrieving, by the storage interface controller, data buffered at the write buffer, based on the determined power mode of the storage device being an active power mode. The storage data manager 635 may be configured as or otherwise support a means for sending, by the storage interface controller, the buffered data to the storage device, based on the determined power mode of the storage device being an active power mode. The storage data manager 635 may be configured as or otherwise support a means for sending, by the storage interface controller, the respective data set to the storage device, based on the determined power mode of the storage device being an active power mode.

In some examples, the respective data set may include a first data set. In some examples, the host application I/O component 625 may be configured as or otherwise support a means for receiving a second data set to write to the storage device, the second data set exclusive of the plurality of data sets. In some examples, the power mode manager 640 may be configured as or otherwise support a means for determining the power mode of the storage device based at least in part on receiving the second data set. In some examples, the power mode manager 640 may be configured as or otherwise support a means for waking up the storage device, based on the determined power mode of the storage device being the inactive power mode and an amount of data stored in the write buffer exceeding a threshold. In some examples, the write buffer manager 630 may be configured as or otherwise support a means for retrieving the first data set from the write buffer, based on the determined power mode of the storage device being the inactive power mode and an amount of data stored in the write buffer exceeding a threshold. In some examples, the storage data manager 635 may be configured as or otherwise support a means for sending the first data set to the storage device, based on the determined power mode of the storage device being the inactive power mode and an amount of data stored in the write buffer exceeding a threshold. In some examples, the storage data manager 635 may be configured as or otherwise support a means for sending the second data set to the storage device, based on the determined power mode of the storage device being the inactive power mode and an amount of data stored in the write buffer exceeding a threshold. In some examples, the power mode manager 640 may be configured as or otherwise support a means for putting the storage device back to sleep, based on the determined power mode of the storage device being the inactive power mode and an amount of data stored in the write buffer exceeding a threshold.

In some examples, the host application I/O component 625 may be configured as or otherwise support a means for receiving a request to read a data set associated with an address of the storage device. In some examples, the write buffer manager 630 may be configured as or otherwise support a means for determining that the data set associated with the address is not stored in the write buffer. In some examples, the storage data manager 635 may be configured as or otherwise support a means for retrieving the data set associated with the address from the storage device. In some examples, the host application I/O component 625 may be configured as or otherwise support a means for sending the retrieved data set to the host device.

In some examples, the power mode manager 640 may be configured as or otherwise support a means for determining, upon receiving the request to read the data set, whether the power mode of the storage device is the inactive power mode. In some examples, the power mode manager 640 may be configured as or otherwise support a means for waking up the storage device based at least in part on determining that the power mode of the storage device is the inactive power mode, wherein retrieving the data associated with the address from the storage device is performed subsequent to waking up the storage device. In some examples, the power mode manager 640 may be configured as or otherwise support a means for commanding the storage device back to the inactive power mode subsequent to retrieving the data associated with the address from the storage device.

Figure 7:
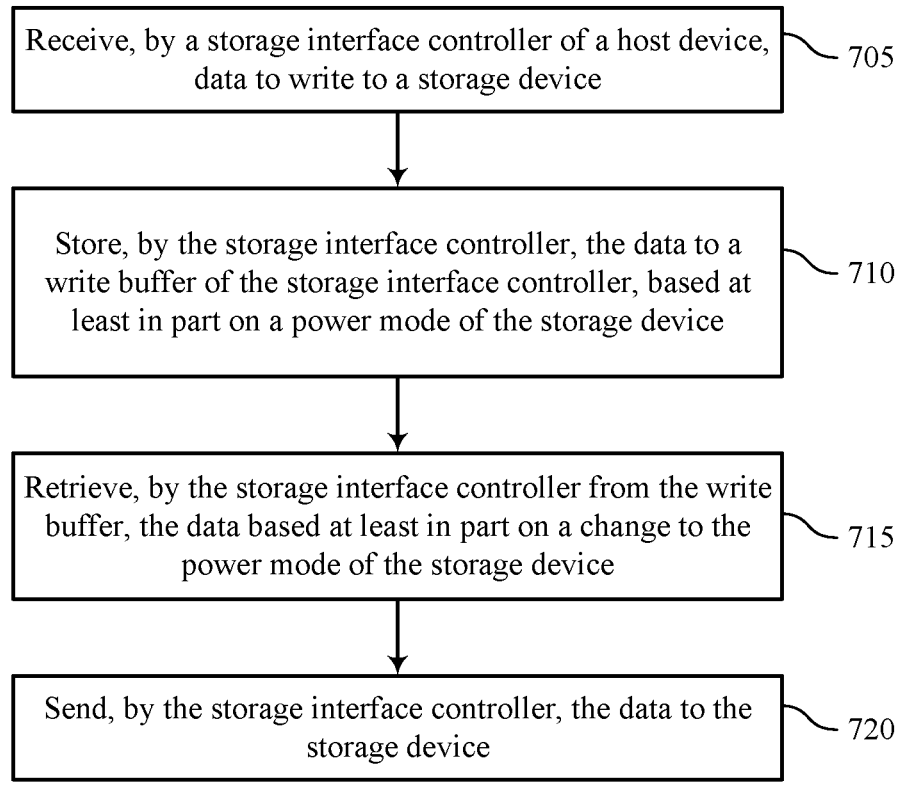
FIGS. 7 and 8 show flowcharts illustrating methods that support write buffer extensions for storage interface controllers in accordance with examples as disclosed herein.

FIG. 7 shows a flowchart illustrating a method 700 that supports write buffer extensions for storage interface controllers in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 705, the method may include receiving, by a storage interface controller of a host device, data to write to a storage device. The operations of 705 may be performed in accordance with examples as disclosed herein. In some examples, aspects of the operations of 705 may be performed by a host application I/O component 625 as described with reference to FIG. 6.

At 710, the method may include storing, by the storage interface controller, the data to a write buffer of the storage interface controller, based at least in part on a power mode of the storage device. The operations of 710 may be performed in accordance with examples as disclosed herein. In some examples, aspects of the operations of 710 may be performed by a write buffer manager 630 as described with reference to FIG. 6.

At 715, the method may include retrieving, by the storage interface controller from the write buffer, the data based at least in part on a change to the power mode of the storage device. The operations of 715 may be performed in accordance with examples as disclosed herein. In some examples, aspects of the operations of 715 may be performed by a write buffer manager 630 as described with reference to FIG. 6.

At 720, the method may include sending, by the storage interface controller, the data to the storage device. The operations of 720 may be performed in accordance with examples as disclosed herein. In some examples, aspects of the operations of 720 may be performed by a storage data manager 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, by a storage interface controller of a host device, data to write to a storage device, storing, by the storage interface controller, the data to a write buffer of the storage interface controller, based at least in part on a power mode of the storage device, retrieving, by the storage interface controller from the write buffer, the data based at least in part on a change to the power mode of the storage device, and sending, by the storage interface controller, the data to the storage device.

In some examples of the method 700 and the apparatus described herein, storing the data to the write buffer may include determining, by the storage interface controller upon receiving the data, whether the power mode of the storage device is an inactive power mode, storing, by the storage interface controller, the data to the write buffer based at least in part on determining that the power mode of the storage device is the inactive power mode, and refraining from waking up the storage device based at least in part on determining that the power mode of the storage device is the inactive power mode.

In some examples of the method 700 and the apparatus described herein, moving the data from the write buffer to the storage device may include determining, by the storage interface controller, whether the power mode of the storage device has changed to an active power mode, and moving, by the storage interface controller, the data from the write buffer to the storage device based at least in part on determining that the power mode of the storage device has changed to the active power mode.

In some examples of the method 700 and the apparatus described herein, storing the data to the write buffer may also be based at least in part on an amount of additional data stored in the write buffer.

Some examples of the method 700 and the apparatus described herein may further include operations, features, circuitry, logic, means, or instructions for determining, by the storage interface controller upon receiving additional data to write to the storage device, whether an amount of data stored in the write buffer satisfies a threshold, determining, by the storage interface controller, whether the power mode of the storage device is an inactive power mode, waking up the storage device, by the storage interface controller, based at least in part on determining that the power mode of the storage device is the inactive power mode and determining that the amount of data stored in the write buffer satisfies the threshold, wherein moving the data from the write buffer to the storage device is performed subsequent to waking up the storage device, and commanding the storage device back to the inactive power mode after moving the data from the write buffer to the storage device.

Some examples of the method 700 and the apparatus described herein may further include operations, features, circuitry, logic, means, or instructions for receiving, at the storage interface controller from an application of the host device, a request to read data associated with an address of the storage device, determining, by the storage interface controller, whether data associated with the address is stored in the write buffer, retrieving from the write buffer, by the storage interface controller, the data associated with the address based at least in part on determining that the data associated with the address is stored in the write buffer, and sending, by the storage interface controller to the application of the host device, the data associated with the address.

Some examples of the method 700 and the apparatus described herein may further include operations, features, circuitry, logic, means, or instructions for receiving, at the storage interface controller from an application of the host device, a request to read data associated with an address of the storage device, determining, by the storage interface controller, that data associated with the address is not stored in the write buffer, retrieving from the storage device, by the storage interface controller, the data associated with the address, and sending, by the storage interface controller to the application of the host device, the data associated with the address.

Some examples of the method 700 and the apparatus described herein may further include operations, features, circuitry, logic, means, or instructions for determining, by the storage interface controller, whether the power mode of the storage device is an inactive power mode, waking up the storage device, by the storage interface controller, based at least in part on determining that the power mode of the storage device is the inactive power mode, wherein retrieving the data associated with the address from the storage device is performed subsequent to waking up the storage device, and commanding the storage device back to the inactive power mode subsequent to retrieving the data associated with the address from the storage device.

Figure 8:
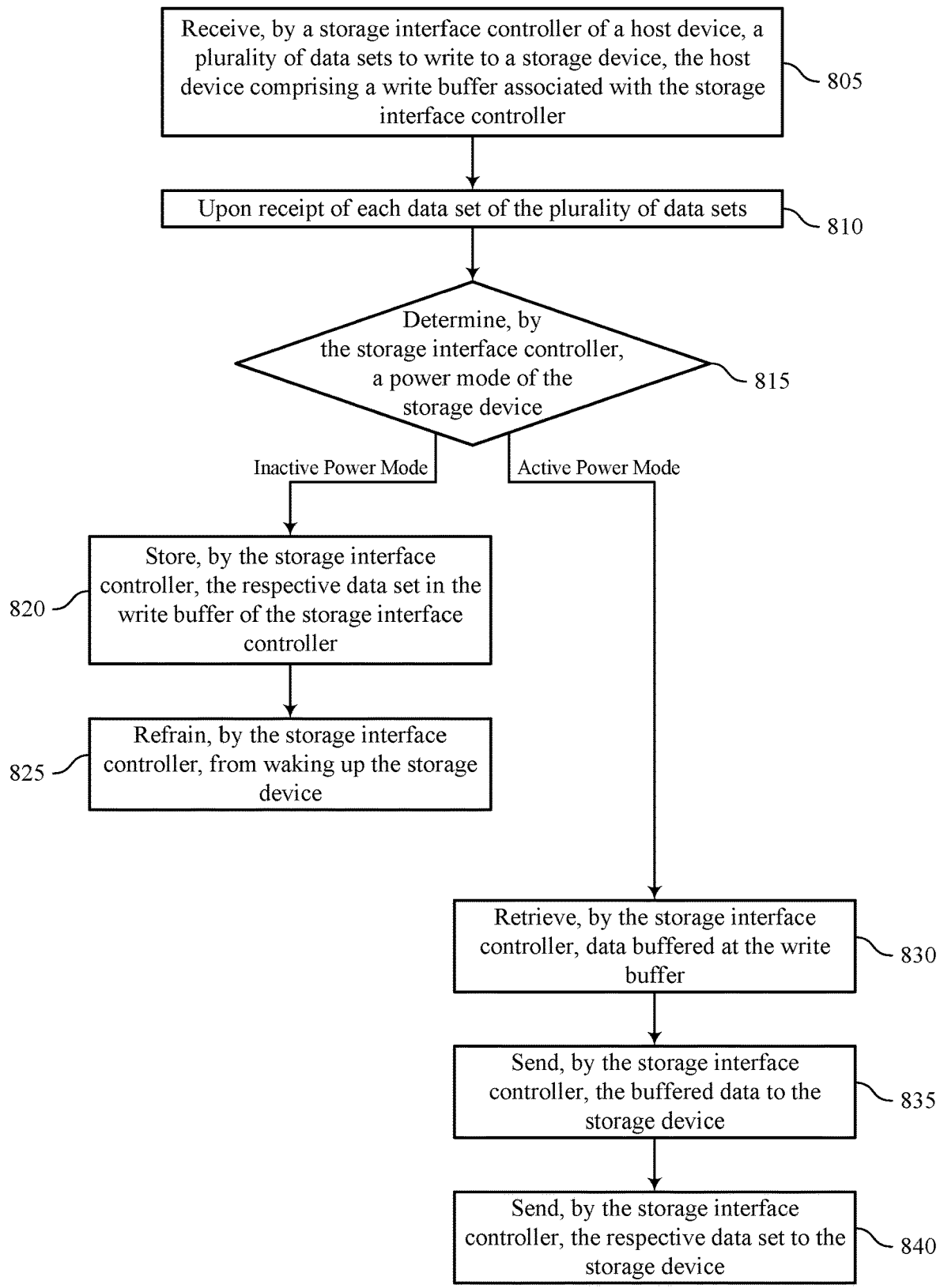

FIG. 8 shows a flowchart illustrating a method 800 that supports write buffer extensions for storage interface controllers in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 805, the method may include receiving, by a storage interface controller of a host device, a plurality of data sets to write to a storage device, the host device comprising a write buffer associated with the storage interface controller. The operations of 805 may be performed in accordance with examples as disclosed herein. In some examples, aspects of the operations of 805 may be performed by a host application I/O component 625 as described with reference to FIG. 6.

At 810, upon receipt of each data set of the plurality of data sets, the method may move to 815. The operations of 810 may be performed in accordance with examples as disclosed herein. In some examples, aspects of the operations of 810 may be performed by a host application I/O component 625 as described with reference to FIG. 6.

At 815, the method may include, upon receipt of each data set of the plurality of data sets, determining, by the storage interface controller, a power mode of the storage device. The operations of 815 may be performed in accordance with examples as disclosed herein. In some examples, aspects of the operations of 815 may be performed by a power mode manager 640 as described with reference to FIG. 6.

Based on the determined power mode of the storage device being an inactive power mode, the method may move to 820 or 825. Based on the determined power mode of the storage device being an active power mode, the method may include 830, 835, and/or 840.

At 820, the method may include storing, by the storage interface controller, the respective data set in the write buffer of the storage interface controller. The operations of 820 may be performed in accordance with examples as disclosed herein. In some examples, aspects of the operations of 820 may be performed by a write buffer manager 630 as described with reference to FIG. 6.

At 825, the method may include refraining, by the storage interface controller, from waking up the storage device. The operations of 825 may be performed in accordance with examples as disclosed herein. In some examples, aspects of the operations of 825 may be performed by a power mode manager 640 as described with reference to FIG. 6.

At 830, the method may include retrieving, by the storage interface controller, data buffered at the write buffer. The operations of 830 may be performed in accordance with examples as disclosed herein. In some examples, aspects of the operations of 830 may be performed by a write buffer manager 630 as described with reference to FIG. 6.

At 835, the method may include sending, by the storage interface controller, the buffered data to the storage device. The operations of 835 may be performed in accordance with examples as disclosed herein. In some examples, aspects of the operations of 835 may be performed by a storage data manager 635 as described with reference to FIG. 6.

At 840, the method may include sending, by the storage interface controller, the respective data set to the storage device. The operations of 840 may be performed in accordance with examples as disclosed herein. In some examples, aspects of the operations of 840 may be performed by a storage data manager 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving, by a storage interface controller of a host device, a plurality of data sets to write to a storage device, the host device comprising a write buffer associated with the storage interface controller, and, upon receipt of each data set of the plurality of data sets, determining, by the storage interface controller, a power mode of the storage device. The apparatus described herein may further include operations, features, circuitry, logic, means, or instructions for, based on the determined power mode of the storage device being an inactive power mode, storing, by the storage interface controller, the respective data set in the write buffer of the storage interface controller and refraining, by the storage interface controller, from waking up the storage device. The apparatus described herein may further include operations, features, circuitry, logic, means, or instructions for, based on the determined power mode of the storage device being an active power mode, retrieving, by the storage interface controller, data buffered at the write buffer, sending, by the storage interface controller, the buffered data to the storage device, and sending, by the storage interface controller, the respective data set to the storage device.

Some examples of the method 800 and the apparatus described herein may further include operations, features, circuitry, logic, means, or instructions for receiving a second data set to write to the storage device, the second data set exclusive of the plurality of data sets and determining the power mode of the storage device based at least in part on receiving the second data set. The apparatus described herein may further include operations, features, circuitry, logic, means, or instructions for, based on the determined power mode of the storage device being the inactive power mode and an amount of data stored in the write buffer exceeding a threshold, waking up the storage device, retrieving the first data set from the write buffer, sending the first data set to the storage device, sending the second data set to the storage device, and putting the storage device back to sleep.

Some examples of the method 800 and the apparatus described herein may further include operations, features, circuitry, logic, means, or instructions for receiving a request to read a data set associated with an address of the storage device, determining that the data set associated with the address is not stored in the write buffer, retrieving the data set associated with the address from the storage device, and sending the retrieved data set to the host device.

Some examples of the method 800 and the apparatus described herein may further include operations, features, circuitry, logic, means, or instructions for determining, upon receiving the request to read the data set, whether the power mode of the storage device is the inactive power mode, waking up the storage device based at least in part on determining that the power mode of the storage device is the inactive power mode, wherein retrieving the data associated with the address from the storage device is performed subsequent to waking up the storage device, and commanding the storage device back to the inactive power mode subsequent to retrieving the data associated with the address from the storage device.

It should be noted that the methods described above describe possible implementations, and that the operations and the steps may be rearranged or otherwise modified and that other implementations are possible. Further, portions from two or more of the methods may be combined An apparatus is described. The apparatus may include a write buffer and a storage interface controller coupled with the write buffer. The storage interface controller may be operable to receive data to write to a storage device, store the data to the write buffer based at least in part on a power mode of the storage device, retrieve, from the write buffer, the data based at least in part on a change to the power mode of the storage device, and send the data to the storage device.

In some examples of the apparatus, to store the data to the write buffer, the storage interface controller may be further operable to determine, upon receiving the data, whether the power mode of the storage device is an inactive power mode, store the data to the write buffer based at least in part on determining that the power mode of the storage device is the inactive power mode, and refrain from waking up the storage device based at least in part on determining that the power mode of the storage device is the inactive power mode.

In some examples of the apparatus, to retrieve the data from the write buffer, the storage interface controller may be further operable to determine whether the power mode of the storage device has changed to an active power mode, and retrieve the data from the write buffer to send to the storage device based at least in part on determining that the power mode of the storage device has changed to the active power mode.

In some examples of the apparatus, the storage interface controller may be further operable to determine, upon receiving additional data to write to the storage device, whether an amount of data stored in the write buffer satisfies a threshold, determine whether the power mode of the storage device is an inactive power mode, wake up the storage device based at least in part on determining that the power mode of the storage device is the inactive power mode and determining that the amount of data stored in the write buffer satisfies the threshold, wherein sending the data from the write buffer to the storage device is performed subsequent to waking up the storage device, and command the storage device back to the inactive power mode after moving the data from the write buffer to the storage device.

In some examples of the apparatus, the storage interface controller may be further operable to receive, from an application of the apparatus, a request to read data associated with an address of the storage device, determine whether data associated with the address is stored in the write buffer, retrieve the data associated with the address from the write buffer based at least in part on determining that the data associated with the address is stored in the write buffer, and send the data associated with the address to the application.

In some examples of the apparatus, the storage interface controller may include a universal flash storage (UFS) controller. In some examples of the apparatus, the storage device may be physically separated from the storage interface controller. In some examples of the apparatus, the write buffer may be positioned on the storage interface controller.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    receiving, by a storage interface controller of a host device, data to write to a storage device;
    storing, by the storage interface controller, the data to a write buffer of the storage interface controller, based at least in part on a power mode of the storage device;
    retrieving, by the storage interface controller from the write buffer, the data based at least in part on a change to the power mode of the storage device; and
    sending, by the storage interface controller, the data to the storage device.

2. The method of claim 1, wherein storing the data to the write buffer comprises:
    determining, by the storage interface controller upon receiving the data, whether the power mode of the storage device is an inactive power mode;
    storing, by the storage interface controller, the data to the write buffer based at least in part on determining that the power mode of the storage device is the inactive power mode; and
    refraining from waking up the storage device based at least in part on determining that the power mode of the storage device is the inactive power mode.

3. The method of claim 1, wherein moving the data from the write buffer to the storage device comprises:
    determining, by the storage interface controller, whether the power mode of the storage device has changed to an active power mode; and
    moving, by the storage interface controller, the data from the write buffer to the storage device based at least in part on determining that the power mode of the storage device has changed to the active power mode.

4. The method of claim 1, wherein storing the data to the write buffer is also based at least in part on an amount of additional data stored in the write buffer.

5. The method of claim 1, further comprising:
    determining, by the storage interface controller upon receiving additional data to write to the storage device, whether an amount of data stored in the write buffer satisfies a threshold;
    determining, by the storage interface controller, whether the power mode of the storage device is an inactive power mode;
    waking up the storage device, by the storage interface controller, based at least in part on determining that the power mode of the storage device is the inactive power mode and determining that the amount of data stored in the write buffer satisfies the threshold, wherein moving the data from the write buffer to the storage device is performed subsequent to waking up the storage device; and
    commanding the storage device back to the inactive power mode after moving the data from the write buffer to the storage device.

6. The method of claim 1, further comprising:
    receiving, at the storage interface controller from an application of the host device, a request to read data associated with an address of the storage device;
    determining, by the storage interface controller, whether data associated with the address is stored in the write buffer;
    retrieving from the write buffer, by the storage interface controller, the data associated with the address based at least in part on determining that the data associated with the address is stored in the write buffer; and
    sending, by the storage interface controller to the application of the host device, the data associated with the address.

7. The method of claim 1, further comprising:
    receiving, at the storage interface controller from an application of the host device, a request to read data associated with an address of the storage device;
    determining, by the storage interface controller, that data associated with the address is not stored in the write buffer;
    retrieving from the storage device, by the storage interface controller, the data associated with the address; and
    sending, by the storage interface controller to the application of the host device, the data associated with the address.

8. The method of claim 7, further comprising:
    determining, by the storage interface controller, whether the power mode of the storage device is an inactive power mode;
    waking up the storage device, by the storage interface controller, based at least in part on determining that the power mode of the storage device is the inactive power mode, wherein retrieving the data associated with the address from the storage device is performed subsequent to waking up the storage device; and
    commanding the storage device back to the inactive power mode subsequent to retrieving the data associated with the address from the storage device.

9. An apparatus, comprising:
    a write buffer; and
    a storage interface controller coupled with the write buffer and operable to:
        receive data to write to a storage device;
        store the data to the write buffer based at least in part on a power mode of the storage device;
        retrieve, from the write buffer, the data based at least in part on a change to the power mode of the storage device; and
        send the data to the storage device.

10. The apparatus of claim 9, wherein storing the data to the write buffer comprises the storage interface controller being further operable to:
    determine, upon receiving the data, whether the power mode of the storage device is an inactive power mode;
    store the data to the write buffer based at least in part on determining that the power mode of the storage device is the inactive power mode; and
    refrain from waking up the storage device based at least in part on determining that the power mode of the storage device is the inactive power mode.

11. The apparatus of claim 9, wherein retrieving the data from the write buffer comprises the storage interface controller being further operable to:
    determine whether the power mode of the storage device has changed to an active power mode; and move data from the write buffer to the storage device based at least in part on determining that the power mode of the storage device has changed to the active power mode.

12. The apparatus of claim 9, wherein the storage interface controller is further operable to:
determine, upon receiving additional data to write to the storage device, whether an amount of data stored in the write buffer satisfies a threshold;
determine whether the power mode of the storage device is an inactive power mode;
wake up the storage device based at least in part on determining that the power mode of the storage device is the inactive power mode and determining that the amount of data stored in the write buffer satisfies the threshold, wherein sending the data from the write buffer to the storage device is performed subsequent to waking up the storage device; and
command the storage device back to the inactive power mode after moving the data from the write buffer to the storage device.

13. The apparatus of claim 9, wherein the storage interface controller is further operable to:
receive, from an application of the apparatus, a request to read data associated with an address of the storage device;
determine whether data associated with the address is stored in the write buffer;
retrieve the data associated with the address from the write buffer based at least in part on determining that the data associated with the address is stored in the write buffer; and
send the data associated with the address to the application.

14. The apparatus of claim 9, wherein the storage interface controller comprises a universal flash storage (UFS) controller.

15. The apparatus of claim 9, wherein the storage device is physically separated from the storage interface controller.

16. The apparatus of claim 9, wherein the write buffer is positioned on the storage interface controller.

17. An apparatus comprising:
a write buffer; and
a storage interface controller coupled with the write buffer and operable to:
receive a plurality of data sets to write to a storage device; and
upon receipt of each data set of the plurality of data sets:
determine a power mode of the storage device;
based on the determined power mode of the storage device being an inactive power mode:
store the respective data set in the write buffer; and
refrain from waking up the storage device; and
based on the determined power mode of the storage device being an active power mode:
retrieve data buffered at the write buffer;
send the data to the storage device; and
send the respective data set to the storage device.

18. The apparatus of claim 17, wherein the respective data set comprises a first data set, and wherein the storage interface controller is further operable to:
receive a second data set to write to the storage device, the second data set exclusive of the plurality of data sets;
determine the power mode of the storage device based at least in part on receiving the second data set; and
based on the determined power mode of the storage device being the inactive power mode and an amount of data stored in the write buffer exceeding a threshold:
wake up the storage device;
retrieve the first data set from the write buffer;
send the first data set to the storage device;
send the second data set to the storage device; and
put the storage device back to sleep.

19. The apparatus of claim 17, wherein the storage interface controller is further operable to:
receive a request to read a data set associated with an address of the storage device;
determine that the data set associated with the address is not stored in the write buffer;
retrieve the data set associated with the address from the storage device; and
send the retrieved data set to a host device.

20. The apparatus of claim 19, wherein the storage interface controller is further operable to:
determine, upon receiving the request to read the data set, whether the power mode of the storage device is the inactive power mode;
wake up the storage device based at least in part on determining that the power mode of the storage device is the inactive power mode, wherein retrieving the data associated with the address from the storage device is performed subsequent to waking up the storage device; and
command the storage device back to the inactive power mode subsequent to retrieving the data associated with the address from the storage device.

* * * * *